M. YAMAGUCHI.
PLOW.
APPLICATION FILED NOV. 24, 1915.
1,210,249.
Patented Dec. 26, 1916.
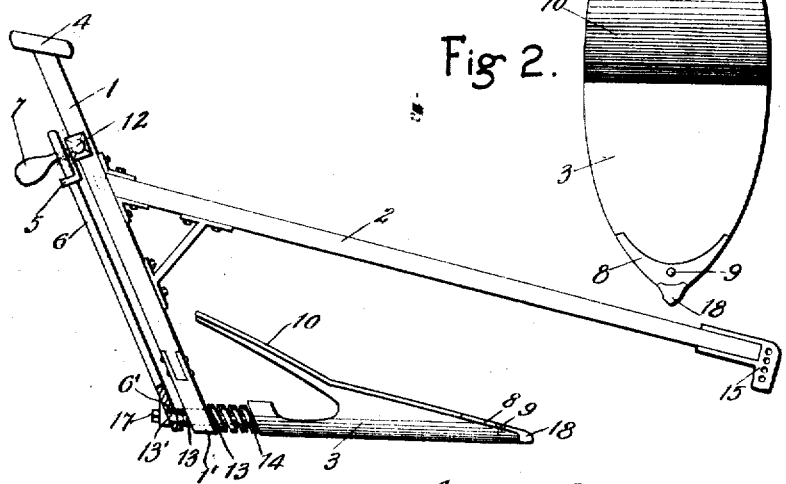
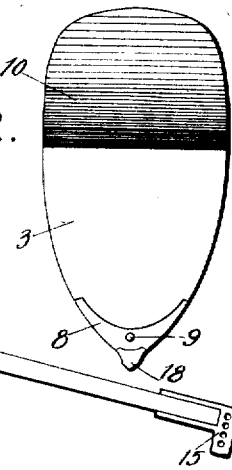
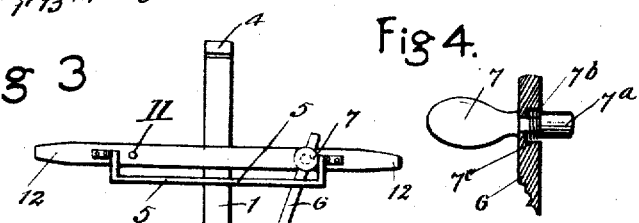
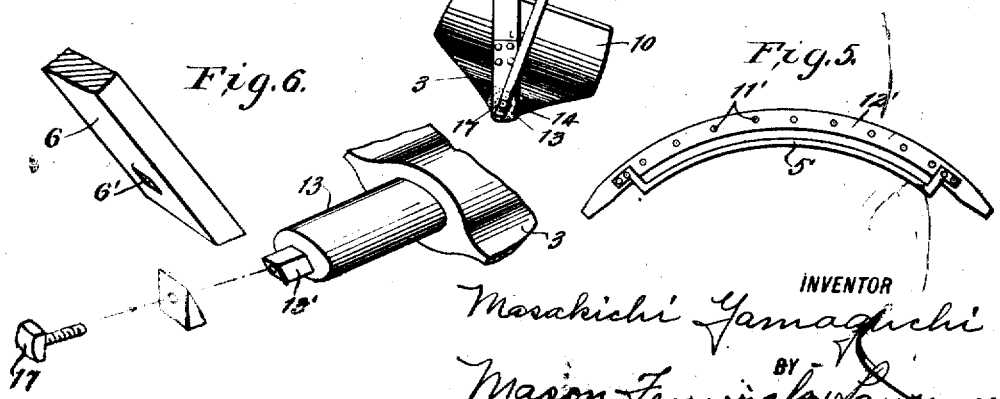
INVENTOR
Masakichi Yamaguchi
BY
Mason Fenwick Lawrence
ATTORNEYS

UNITED STATES PATENT OFFICE.

MASAKICHI YAMAGUCHI, OF SEATTLE, WASHINGTON.

PLOW.

1,210,249.  Specification of Letters Patent.  Patented Dec. 26, 1916.

Application filed November 24, 1915. Serial No. 63,279.

*To all whom it may concern:*

Be it known that I, MASAKICHI YAMA-GUCHI, a subject of the Emperor of Japan, residing at Seattle, in the county of King and State of Washington, have invented certain new and useful Improvements in Plows; and I do hereby declare the following to be a full, clear, and exact description of the invention, such as will enable others skilled in the art to which it appertains to make and use the same.

This invention relates to plows, and to particularly the class of plows for use on rough or hilly ground where it is desirable to always throw the furrow down hill. One object of this invention is to provide a plow with both sides made similar and sloping upward from the bottom on each side, and to provide means for adjusting and holding the plow at the angle desired in ordinary side hill use, and particularly for holding the plow portion in position to throw the furrow continuously in one direction while the plow is being moved to and fro.

In the drawings Figure 1 represents a side view of the plow complete: Fig. 2 represents a top view of the shovel portion of the plow; Fig. 3 represents a back view of the plow; Fig. 4 represents a detail plan of latch for reversing lever; Fig. 5 is a rear elevation of a slightly modified form of the guide for the lever; and Fig. 6 is a perspective detail of the connection at the rear end of the plow-shank, with the parts thereof slightly separated.

Like numerals refer to like parts in different views.

1, represents or refers to the single standard carrying a handle for guiding the plow, and 2 is the ordinary beam, 3 the plow or shovel, 4 the hand hold at top of 1, 5 is a loop for holding in place the reversing lever 6, 7 is the handle for operating the latch pin 7ª, and 7ᵇ is coil spring for holding the latch pin in a normally extended position outward from the seat 7ᶜ cut into the front side of the lever 6.

8 shows a point which is held in position on the shovel 3 by a screw or bolt 9, and 10 shows the heel inclined upward at the rear portion of the plow shovel.

12 is a cross bar securely fixed to the standard 1 at right angles thereto and carrying the loop 5 which is bent backward and downward to permit the reverse lever being operated between its portion parallel with cross bar 12, the downward bend permitting the free swing of the latch handle 7 with the reversing lever.

11, 11 shows the holes in cross bar 12 into which the latch pin 7ª fits to hold the lever in its respective positions, and so hold also the plow shovel tipped to either side. It will be readily seen that by forming the cross bar on a curve with its center at highest point as seen at 12' in Fig. 5 and providing it with a number of holes 11' the latch pin would travel in the same arc as the curve of the bar and so enable the operator to hold the shovel in any desired position between the two extremes shown here on the drawings; but for the purpose of illustrating the simplest form of the invention I deem it sufficient to show the cross bar 12 in Fig. 3 as straight with only two holes.

13 is a shank projecting to the rear from the transverse center of the shovel. This shank is round and slidably and rotatably mounted through the lower end of standard 1. It is provided with a tenon 13' at its rear end, which tenon is of angular and preferably square cross section as best seen in Fig. 6, and a correspondingly shaped hole 6' through the lower end of lever 6 permits the lever to thus fit over the tenon so that as the lever is moved sidewise the shank 13 is turned or oscillated on its axis and the shovel adjusted as desired. A suitable wide headed screw 17 holds the lever 6 on the said square tenon. A suitable heavy coil spring 14 is fitted around the shank 13 between the standard 1 and the shovel 3 which holds the shovel normally pressed forward from the standard, but when the point 18 strikes a root or stone certain elasticity is provided by the spring 14 which tends to reduce the shock or jar that is commonly experienced by the operator or mechanism on such occasions. The point 8 is preferably beveled at 18 to slope downward at a sharp angle and so holds the plow in the ground, while the depth of the furrow is further regulated by adjusting the draft in the holes of the clevis 15 at the front of the beam 2.

In operation the horse or other power is attached and the plow is oscillated by the lever and set at the desired angle to right or left to agree with the side slope of the surface to be plowed, to turn the furrow down the slope, as the operator guides the machine with the handle 4. When he has plowed a furrow across the side hill and reached its end, he turns the horse and plow around preparatory to returning across the side hill in the opposite direction for plowing the next furrow; but now, in order to again turn the furrow down the slope, he must reverse the position of the shovel as will be clear. This is accomplished by disengaging the latch pin 7ª from one extreme hole 11 as seen in Fig. 3, and throwing the lever over to the other end of the loop 5 and engaging the pin with the opposite extreme hole. If holes exist between the two extremes, as seen at 11' in Fig. 5, they are obviously serviceable for permitting the adjustment of the lever at points between its extreme positions as is desirable when he does not wish to set the shovel at its extreme angle to either side. But whether said shovel is set to its extreme or in any other position, when it strikes an obstruction it will be clear that the spring 14 serves as a shock absorber to prevent fracture of parts until either the obstruction is overcome or the horse or team comes to a stop and the obstruction can be avoided.

What I claim is:

1. In a plow, a standard having a bearing near its lower end; combined with a shovel having a shank projecting to the rear from its transverse center and mounted for oscillation in said bearing, a coiled spring surrounding the shank between the shovel-body and standard, a lever rigidly secured to and rising from the rear end of the shank and adapted to be swung from side to side to oscillate the shovel, and means carried by the standard for holding said lever in its adjusted position.

2. In a plow, a standard having a bearing near its lower end; combined with a shovel having a shank projecting to the rear from its transverse center and mounted for oscillation in said bearing, a shock absorber between the rear end of the shovel and the standard, a lever rigidly mounted on the rear end of the shank and adapted to be swung from side to side to oscillate the shovel, a cross bar carried by the standard and along which the lever moves, and means for fastening the lever to the cross bar in its adjusted positions.

3. In a plow, a standard having a bearing near its lower end; combined with a round shank projecting to the rear from the shovel and mounted for rotation in said bearing, its rear extremity having a tenon of angular cross section, a lever having an angular hole engaging said tenon, means for holding it removably thereon, a latch pin near the upper end of the lever, and a cross bar carried by the standard and having holes with which said pin engages in the adjusted positions of the lever.

4. In a plow, a standard having a bearing near its lower end; combined with a round shank projecting to the rear from the shovel and mounted for rotation in said bearing, its rear extremity having a tenon of angular cross section, a lever having an angular hole engaging said tenon, means for holding it removably thereon, a spring-actuated latch pin through the lever near its upper end, a cross bar carried by the standard and having holes with which said pin is adapted to engage in the adjusted positions of the lever, and a loop carried by the cross bar and serving as a guide for the lever.

In testimony whereof I affix my signature in presence of two witnesses.

MASAKICHI YAMAGUCHI.